(12) United States Patent
Lim

(10) Patent No.: US 9,028,995 B2
(45) Date of Patent: May 12, 2015

(54) SECONDARY BATTERY INCLUDING ELECTRODE ASSEMBLY HAVING EXCELLENT JELLY ROLL STRUCTURE

(75) Inventor: Wan-Mook Lim, Yongin-Si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 599 days.

(21) Appl. No.: 12/944,676

(22) Filed: Nov. 11, 2010

(65) Prior Publication Data

US 2011/0117405 A1    May 19, 2011

(30) Foreign Application Priority Data

Nov. 17, 2009    (KR) .................. 10-2009-0110916

(51) Int. Cl.
*H01M 6/10* (2006.01)
*H01M 10/04* (2006.01)

(52) U.S. Cl.
CPC ................. *H01M 10/0431* (2013.01)

(58) Field of Classification Search
None
See application file for complete search history.

(56) References Cited

U.S. PATENT DOCUMENTS

2006/0269835 A1* 11/2006 Song ..................... 429/142
2007/0172726 A1*  7/2007 Miller et al. ............ 429/142

FOREIGN PATENT DOCUMENTS

| JP | 10-116626      | 5/1998  |
| KR | 10-2006-0000100 | 1/2006  |
| KR | 10-2007-0000799 | 1/2007  |
| KR | 10-2007-0025686 | 3/2007  |
| KR | 10-2007-0101444 | 10/2007 |

* cited by examiner

*Primary Examiner* — Sarah A Slifka
(74) *Attorney, Agent, or Firm* — Knobbe Martens Olson & Bear LLP

(57) ABSTRACT

A secondary battery including an electrode assembly comprises: an outermost electrode an electrode assembly comprising an outermost electrode, an inner electrode, and a separator disposed between the outermost and inner electrodes, wherein the outermost electrode, the inner electrode and the separator are wound together; a case that accommodates the electrode assembly; and a cap assembly coupled to the case, wherein the outermost electrode and the separator disposed under the outermost electrode extend beyond the inner electrode disposed under the separator in a lengthwise direction of the winding by 3 cm or greater.

13 Claims, 3 Drawing Sheets

SECONDARY BATTERY INCLUDING ELECTRODE ASSEMBLY HAVING EXCELLENT JELLY ROLL STRUCTURE

RELATED APPLICATIONS

This application claims the benefit of Korean Patent Application No. 10-2009-0110916, filed on Nov. 17, 2009, in the Korean Intellectual Property Office, the disclosure of which is incorporated herein in its entirety by reference.

BACKGROUND

1. Field

One or more embodiments of the present invention relate to a secondary battery, and more particularly, to a secondary battery including an electrode assembly having an excellent jelly roll structure.

2. Description of the Related Art

Secondary batteries are rechargeable batteries widely used in portable electronic devices such as cellular phones, notebook computers, and camcorders.

A secondary battery typically has a structure in which an electrode assembly including a positive electrode, a negative electrode, and a separator wound in a jelly roll shape is enclosed in a case, and the case is covered with a cap assembly. The separator of the electrode assembly is typically formed of an insulating material such as polypropylene (PP) or polyethylene (PE) and is interposed between the positive electrode and the negative electrode to prevent a short circuit between the positive electrode and the negative electrode. Thus, in normal operating conditions, the electrodes are not short-circuited in the electrode assembly of the secondary battery.

However, if a secondary battery is exposed to a high temperature environment, a short circuit may occur. That is, if a secondary battery is exposed to a high temperature environment, the separator insulating the positive electrode and the negative electrode thermally may shrink. Accordingly, the positive electrode may directly contact the negative electrode, and thus a short circuit may occur. The short circuit further may increase the internal temperature of the secondary battery until the secondary battery explodes. In a combustion test in which a secondary battery is heated to 110° C. by using a torch, a separator shrinks and ignition had occurred. Such thermal shrinking starts at the outermost end of the jelly roll structure, which is where external heat first reaches.

Therefore, there is a need to develop a secondary battery that may be safely exposed to a high temperature environment.

SUMMARY

One or more embodiments of the present invention include a secondary battery having excellent jelly roll structure to prevent a short circuit in an electrode assembly exposed to a high temperature environment.

Additional aspects will be set forth in part in the description which follows and, in part, will be apparent from the description, or may be learned by practice of the presented embodiments.

According to one or more embodiments of the present invention, a secondary battery includes an electrode assembly including an outermost electrode, an inner electrode, and a separator disposed between the outermost and inner electrodes, wherein the outermost electrode, the inner electrode and the separator are wound together; a case that accommodates the electrode assembly; and a cap assembly coupled to the case, wherein the outermost electrode and the separator disposed under the outermost electrode extend beyond the inner electrode disposed under the separator in a lengthwise direction of the winding by 3 cm or greater.

The outermost electrode may be the negative electrode, and the counter electrode may be the positive electrode.

The length of the outermost electrode extended beyond the inner electrode may be the same as the length of the separator disposed under the outermost electrode extended beyond the inner electrode.

The length of the separator disposed under the outermost electrode extended beyond the inner electrode may be greater than the length of the outermost electrode extended beyond the inner electrode.

A degree of thermal shrinkage of the separator in the lengthwise direction may be greater than that in a widthwise direction.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
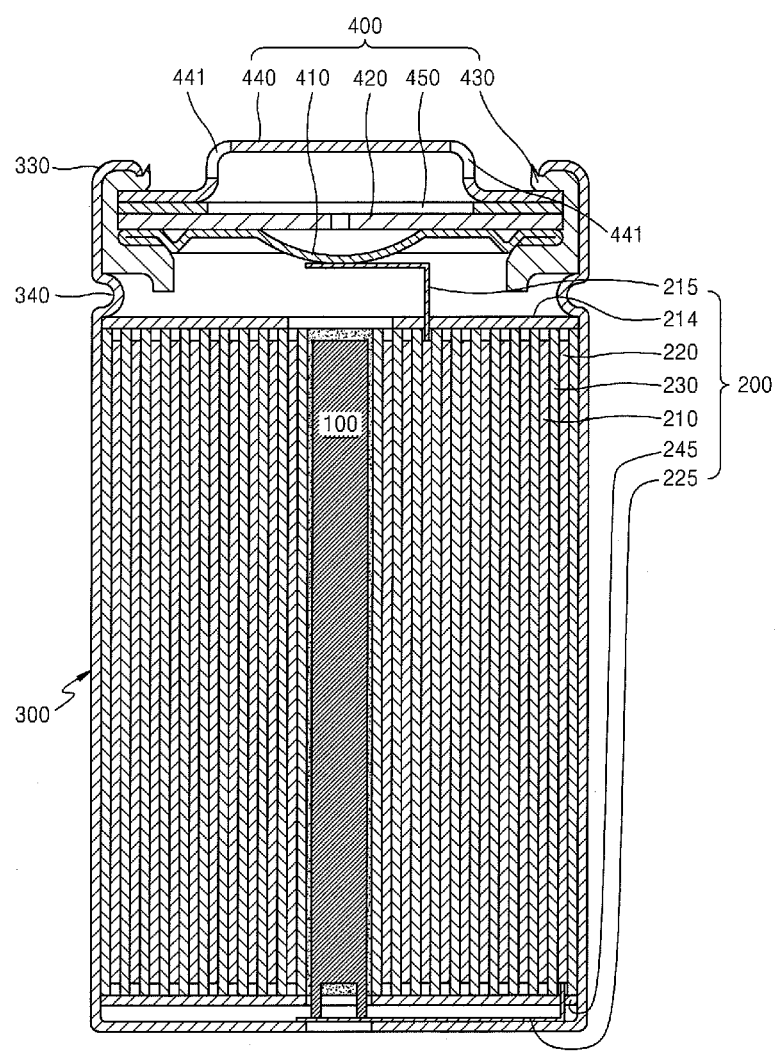
FIG. 1 shows a schematic structure of a secondary battery according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

FIG. 1 shows a schematic structure of a secondary battery according to an embodiment of the present invention. Referring to FIG. 1, the secondary battery according to the present embodiment includes an electrode assembly 200 including a positive electrode 210, a negative electrode 220, and a separator 230 that are wound together, a case 300 that accommodates the electrode assembly 200, and a cap assembly 400 coupled to an opening of the case 300. The electrode assembly 200 may be inserted into the case 300 through the opening of the case 300, and by sealing the case 300 with the cap assembly 400, a bare cell in which the electrode assembly 200 is safely accommodated is provided. The secondary battery may also include a center pin 100 that is disposed at the center of the electrode assembly 200, a negative electrode tap 225 that is connected to the negative electrode 220 of the electrode assembly 200, a positive electrode tap 215 that is connected to the positive electrode 210 of the electrode assembly 200, and insulating plates 214 and 245. The cap assembly 400 may include a safety vent 410 that is connected to the positive electrode tap 215 and that may be deformed and fractured when the internal pressure in the case 300 increases due to overcharging or overheating, a printed circuit board 420 that is deformed and fractured when the safety vent 410 is deformed, a thermistor 450 that breaks an electrical connection when the temperature is greater than a certain level, and an upper cap 440 that is connected to an external terminal to which current is supplied. The cap assembly 400 is supported between a crimping unit 330 and a beading unit 340 of the case 300 with a gasket 430 interposed. The upper cap 440 includes a vent hole 441, and internal gas may be discharged through the vent hole 441 when the safety vent 410 is fractured.

In this regard, the electrode assembly 200 may be prepared by stacking the positive electrode 210, the negative electrode 220, and the separator 230 interposed between the positive and negative electrodes 210 and 220, and winding the stack several times into a jelly roll shape. In the electrode assembly 200, a separator 230-1 may be disposed on the positive electrode 210, a negative electrode 220 may be disposed on the separator 230-1, and a separator 230-2 may be disposed on the negative electrode 220. Since the separator 230-2 disposed on the negative electrode 220 prevents direct contact between the negative electrode 220 and the positive electrode 210 in subsequent windings, the separator 230-2 may not cover the entire negative electrode 220 since there is no more winding. In this structure, external heat can first reach the separator 230-1 disposed between the positive and negative electrodes 210 and 220. That is, even though the separator 230-2 disposed on the negative electrode 2020 may shrink, a short circuit does not occur since the positive electrode 210 is not disposed on the separator 230-2. However, if the separator 230-1 disposed between the positive and negative electrodes 210 and 220 shrinks, the positive electrode 210 would directly contact the negative electrode 220, thereby causing a short circuit. As described above, since external heat first reaches the outermost layer, the separator 230-1 disposed between the positive and negative electrodes 210 and 220 in the outermost layer may shrink. Meanwhile, even though the outermost layer is the negative electrode 220, and the positive electrode 210 is disposed under the negative electrode 220 according to the present embodiment, the order of stacking the electrodes may vary.

In the electrode assembly 200 according to the present embodiment, the outermost negative electrode 220 and the separator 230-1 disposed under the outermost negative electrode 220 extends in a lengthwise direction by 3 cm or greater (ΔL) than the positive electrode 210 disposed under the separator 230-1. Thus, due to the extend length, the positive electrode 210 does not directly contact the negative electrode 220 when the separator 230-1, when exposed to a high temperature environment, shrinks due to the external heat. That is, if the separator 230-1 is longer than the positive electrode 210 by 3 cm or greater, a short circuit may be prevented when exposed to a high temperature environment. In this regard, the negative electrode 220 is also longer than the positive electrode 210 by 3 cm or greater since the negative electrode 220 is to cover the separator 230-1 to protect the separator 230-1 from the external heat, to prevent rapid thermal shrinkage of the separator 230-1. The extension has an effect that may be identified by a combustion test using a torch, and the results of the combustion test are shown in Table 1 below.

TABLE 1

| | Length of positive electrode (cm) | Lengths of negative electrode and separator (cm) | Safety vent operating time (Sec.) | Ignition time (Sec.) |
| --- | --- | --- | --- | --- |
| Comparative Example 1 | 0 | 1 | 60 | 60 |
| Comparative Example 2 | 0 | 2 | 80 | 80 |
| Comparative Example 3 | 2 | 3 | 62 | 62 |
| Comparative Example 4 | 2 | 4 | 78 | 78 |
| Comparative Example 5 | 4 | 5 | 56 | 56 |
| Comparative Example 6 | 4 | 6 | 84 | 84 |
| Example 1 | 0 | 3 | 91 | 102 |
| Example 2 | 0 | 5 | 88 | 117 |
| Example 3 | 2 | 5 | 90 | 107 |
| Example 4 | 2 | 7 | 95 | 115 |
| Example 5 | 4 | 7 | 86 | 105 |

Referring to Table 1, the length of the positive electrode '0' indicates a reference point of the end of the positive electrode. The length of the positive electrode is not an absolute value, and the relative difference of the length between the positive electrode and the negative electrode and between the positive electrode and the separator can be significant. In addition, the operating time of the safety vent 410 (FIG. 1) indicates a time period starting from when the temperature of the secondary battery is first increased to increase the internal pressure by heating using a torch, to when the safety vent 410 is deformed and fractured and the gas safely discharged through the vent hole 441. Thus, if the operating time of the safety vent 410 is the same as the ignition time, the safety vent 410 was damaged by an explosion due to an ignition before the safety vent 410 was able to start a normal operation of discharging the gas. That is, the electrodes were short-circuited due to excessive thermal shrinkage of the separator 230-1, the temperature of the secondary battery rapidly increased, and thus the secondary battery exploded before the safety vent 410 was able to start operating as intended.

Thus, as shown in Table 1, when the lengths of the negative electrode 220 and the separator 230-1 were longer than the positive electrode 210 by less than 3 cm, as in Comparative Examples 1 to 6, the ignition time was the same as the operating time of the safety vent 410, which means that the secondary battery exploded due to a short circuit before the safety vent 410 was able to operate. On the other hand, as in Examples 1 to 5, when the lengths of the negative electrode 220 and the separator 230-1 were longer than the positive electrode 210 by 3 cm or greater, the safety vent 410 was able to start the gas discharging operation. The secondary battery ignited since the combustion test was performed using a torch at about 110° C. until ignition occurred. However, the secondary battery did not explode since the gas was able to be safely discharged. As a result, if the lengths of the negative electrode 220 and the separator 230-1 are longer than the positive electrode 210 by 3 cm or greater, a short circuit caused by thermal shrinkage of the separator 230-1 when in a high temperature environment may be prevented, so that the secondary battery may also be prevented from exploding.

Figure 2:
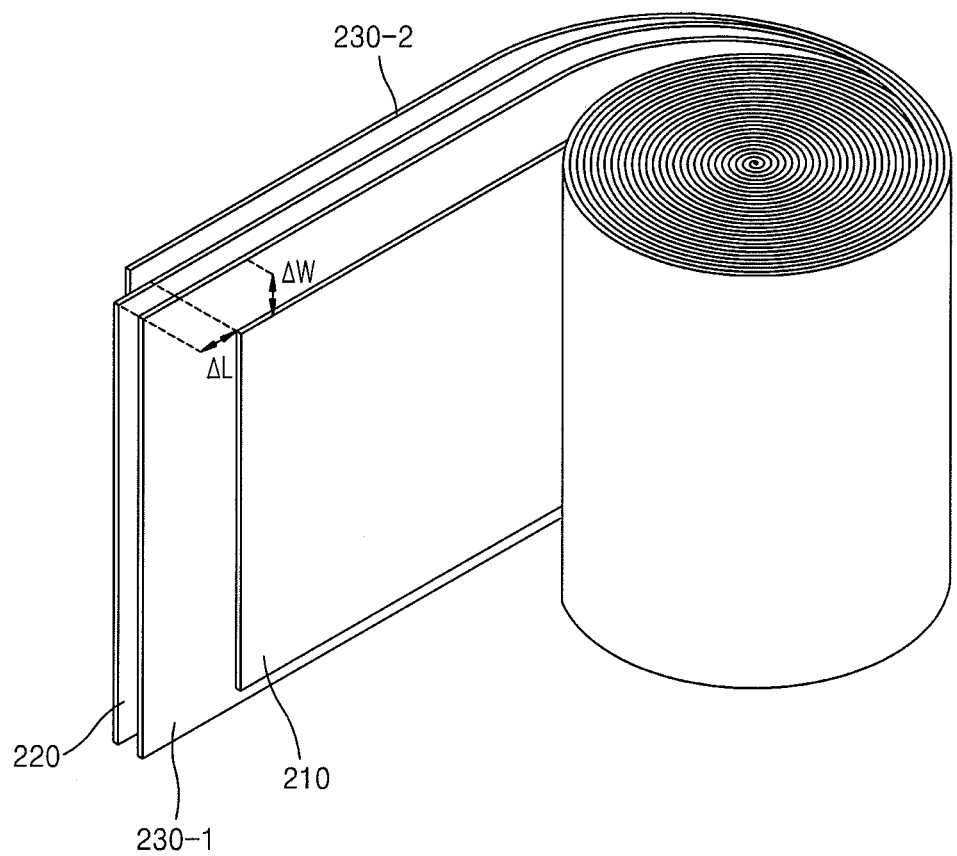
FIG. 2 shows a schematic jelly roll structure of an electrode assembly of the secondary battery of FIG. 1.

Meanwhile, while the separator 230-1 mostly shrinks in the lengthwise direction, separator 230-1 may also shrink in a widthwise direction, that is, a direction perpendicular to the lengthwise direction, as well as the lengthwise direction. The separator 230-1 may be prepared by elongating a material such as polypropylene (PP) and polyethylene (PE) in the lengthwise direction, and thus shrinkage of the separator 230-1 may be mostly performed in the lengthwise direction. However, the electrode 220 and the separator 230-1 may also extend in the widthwise direction (Δw) from the positive electrode 210 as shown in FIG. 2 for safety.

Figure 3:
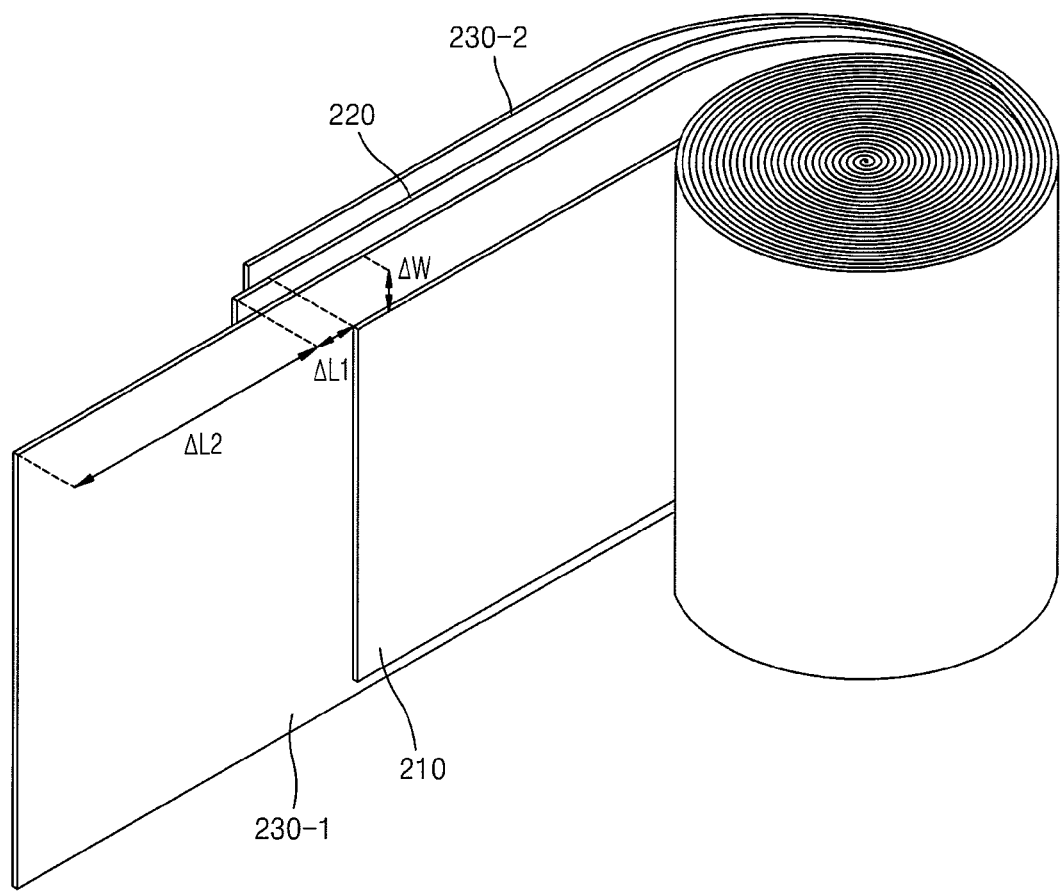
FIG. 3 shows a schematic jelly roll structure of an electrode assembly according to another embodiment.

FIG. 3 shows a schematic jelly roll structure of an electrode assembly according to another embodiment. Referring to FIG. 3, the outermost ends of the negative electrode 220 and the separator 230-1 extend in the lengthwise direction by 3 cm or greater from the positive electrode 210, wherein the separator 230-1 is longer than the negative electrode 220. In this regard, due to an extension (ΔL1) of the negative electrode 220 and the separator 230-1 and another extension (ΔL2) of the separator 230-1, the secondary battery may have a safe structure in case of thermal shrinkage when in a high temperature environment.

As described above, even when the secondary battery is exposed to a high temperature environment, a short circuit between the positive electrode and the negative electrode of the electrode assembly may be prevented since the separator is sufficiently long with respect to thermal shrinkage of the separator.

Meanwhile, although a cylindrical type secondary battery is shown in the present embodiment, any type of secondary battery, such as a rectangular or pouch type secondary battery, in which an electrode assembly having a jelly roll structure is contained, may be used.

As described above, according to the one or more of the above embodiments of the present invention, a short circuit in the electrode assembly of the secondary battery may be prevented when in a high temperature environment since the separator extends from the positive and negative electrodes so that the positive electrode may not directly contact the negative electrode due to thermal shrinkage of the separator.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery comprising:
an electrode assembly comprising an outermost electrode comprising a substrate and an active material, an inner electrode comprising a substrate and an active material, and a separator disposed between the outermost and inner electrodes, wherein the outermost electrode, the inner electrode and the separator are wound together;
a case that accommodates the electrode assembly; and
a cap assembly coupled to the case,
wherein the outermost electrode and the separator disposed under the outermost electrode extend beyond the inner electrode in a lengthwise direction of the winding by 3 cm or greater.

2. The secondary battery of claim 1, wherein the outermost electrode is a negative electrode, and the inner electrode is a positive electrode.

3. The secondary battery of claim 2, wherein the length of the outermost negative electrode extended beyond the inner electrode is the same as the length of the separator disposed under the negative electrode extended beyond the inner electrode.

4. The secondary battery of claim 2, wherein the length of the separator disposed under the negative electrode extended beyond the inner electrode is greater than the length of the outermost negative electrode extended beyond the inner electrode.

5. The secondary battery of claim 1, wherein the separator comprises a degree of thermal shrinkage in the lengthwise direction greater than that in a widthwise direction.

6. An electrode assembly comprising:
an outermost electrode comprising a substrate and an active material;
an inner electrode comprising a substrate and an active material; and
a separator disposed between the outermost and inner electrodes, wherein the outermost electrode, the inner electrode and the separator are wound together;
wherein the outermost electrode and the separator disposed under the outermost electrode are larger in length than the inner electrode in a lengthwise direction of the winding in order to inhibit the inner electrode from contacting the outermost electrode when the separator thermally shrinks.

7. The electrode assembly of claim 6, wherein the outermost electrode and the separator extend beyond the inner electrode in a lengthwise direction by a length of 3 cm or greater.

8. The electrode assembly of claim 6, wherein the separator is larger in width than the inner electrode in a direction perpendicular to the lengthwise direction of the winding.

9. The electrode assembly of claim 6, wherein the outermost electrode is a negative electrode, and the inner electrode is a positive electrode.

10. The electrode assembly of claim 6, wherein the length of the outermost electrode extended beyond the inner electrode is the same as the length of the separator disposed under the electrode extended beyond the inner electrode.

11. The electrode assembly of claim 6, wherein the length of the separator disposed under the outermost electrode extended beyond the inner electrode is greater than the length of the outermost electrode extended beyond the inner electrode.

12. The electrode assembly of claim 6, wherein the separator comprises a degree of thermal shrinkage in the lengthwise direction greater than that in a widthwise direction.

13. A secondary battery comprising the electrode assembly of claim 6.

* * * * *